United States Patent

Barker

[15] 3,681,869
[45] Aug. 8, 1972

[54] ANIMAL TRAP

[72] Inventor: Fred Vester Barker, Rhodell, W. Va.

[22] Filed: Aug. 19, 1971

[21] Appl. No.: 172,972

[52] U.S. Cl. ................................................43/66
[51] Int. Cl. ..........................................A01m 23/08
[58] Field of Search............43/66, 64, 65, 67, 60, 58

[56] References Cited

UNITED STATES PATENTS

| 944,926 | 12/1909 | Turnbo | 43/66 |
| 1,381,464 | 6/1921 | Hulsmann | 43/66 |

FOREIGN PATENTS OR APPLICATIONS

| 932,190 | 11/1947 | France | 43/58 |
| 17,092 | 1891 | Great Britain | 43/60 |

Primary Examiner—Werner H. Camp
Attorney—Alexander B. Blair et al.

[57] ABSTRACT

An animal trap which includes a box having a cover with a tube opening through one end of the box and extending upwardly to the other end of the box at an angle to the horizontal. An opening on the top side of the tube intermediate its ends is provided and a hard ball is positioned in the tube nearly filling the tube. The animal to be trapped presses against the ball and rolls the ball up the tube until he can pass out of the tube through the top side opening therein whereupon the ball rolls back down the tube and traps the animal in the box.

5 Claims, 4 Drawing Figures

PATENTED AUG 8 1972 3,681,869

INVENTOR.
FRED VESTER BARKER
BY
Victor J. Evans & Co.
ATTORNEYS.

ANIMAL TRAP

BACKGROUND OF THE INVENTION

FIELD OF OF THE INVENTION

The present invention relates to animal traps of the type known as live traps.

SUMMARY OF THE INVENTION

The present invention is directed to a live trap for animals in which a covered container is provided with food and water for trapped animals. A tube opens through one end wall of the trap and slopes upwardly to the opposite end wall having an opening in the top side thereof intermediate its opposite ends. A hard ball is mounted within the tube nearly filling the same and adapted to be rolled up the tube by an animal seeking access to the food and water. A detent at the bottom of the tube prevents the ball from rolling out of the tube. The animal noses the ball up the tube and then passes through the access opening in the tube into the box while the ball rolls back down the tube against the detent to trap the animal in the box.

The primary object of the invention is to provide a live animal trap which uses the animal's normal instinct for pushing objects out of their way to become trapped.

Other objects and advantages will become apparent in the following specification when considered in the light of the attached drawings.

DESCRIPTION OF THE PREFERRED EMBODIMENT

Figure 1:
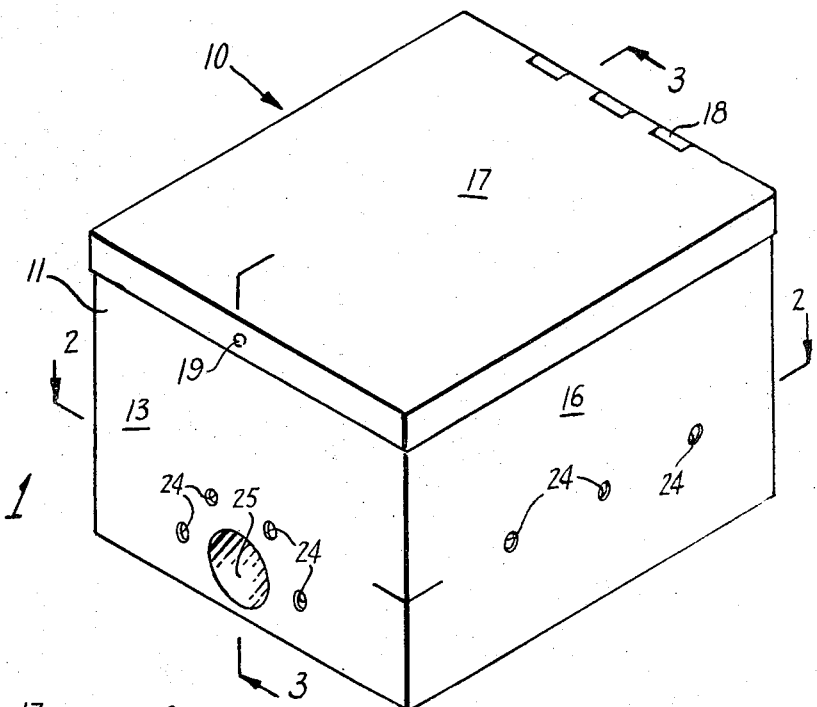
FIG. 1 is a perspective view of the invention.
Figure 3:
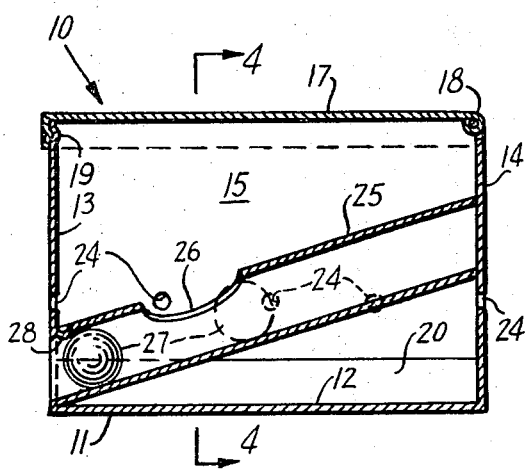
FIG. 3 is a vertical sectional view taken along the line 3—3 of FIG. 1 looking in the direction of the arrows.
Figure 2:
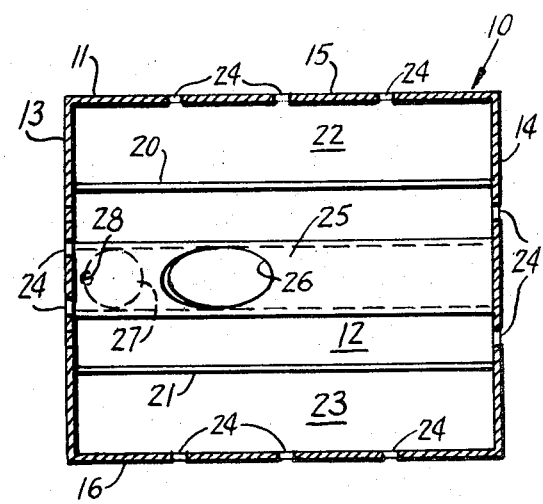
FIG. 2 is a horizontal sectional view taken along the line 2—2 of FIG. 1 looking in the direction of the arrows.
Figure 4:
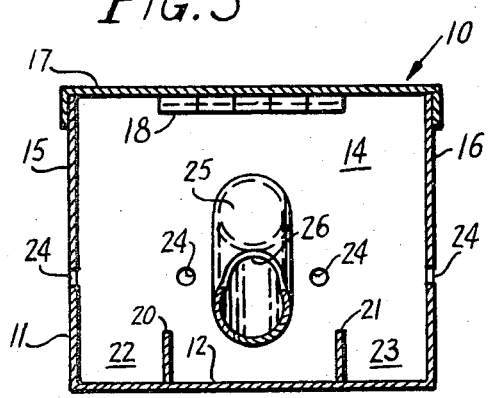
FIG. 4 is a transverse sectional view taken along the line 4—4 of FIG. 3 looking in the direction of the arrows.

Referring now to the drawings in detail wherein like reference characters indicate like parts throughout the several figures the reference numeral 10 generally indicates the live animal trap constructed in accordance with the invention.

The live animal trap 10 includes a generally rectangular sheet metal box 11 having a flat bottom wall 12, a pair of spaced parallel end walls 13, 14 integrally formed on the bottom wall 12 and extending perpendicularly upwardly therefrom. A pair of side walls 15, 16 extend perpendicularly upwardly from the bottom wall 12 and are integrally joined to the end walls 13, 14 at their meeting edges. A generally rectangular cover 17 is secured to the end wall 14 by a horizontal hinge 18 to normally close the box 11. The latch 19 normally secures the cover 17 in closed position in engagement with the top edges of the end walls 13, 14 and the side walls 15, 16. A pair of relatively short partitions 20, 21 are formed on the bottom wall 12 extending between the end walls 13, 14 in spaced parallel relation to the side walls 15, 16 respectively. The partitions 20, 21 form compartments 22, 23 respectively for food and water. A plurality of vent holes 24 are formed in the end walls 13, 14 and the side walls 15, 16 for reasons to be assigned.

A generally cylindrical tube 25 is mounted in the box 11 and extends from the end wall 13 to the end wall 14 from a position adjacent the bottom wall 12 to a position well above the bottom wall 12. The tube 25 opens through the end wall 13 at its lowermost position. An opening 26 is formed in the tube 25 on the upper face thereof intermediate the end walls 13, 14. A spherical ball 27 is positioned in the tube 25 and has a diameter slightly less than the internal diameter of the tube 25 so that it can roll freely therein. The ball 27 is formed of sufficiently hard material such as glass, to prevent it being destroyed by gnawing of the trapped animal. A detent 28 is formed in the lower end of the tube 25 to prevent the ball 27 from rolling out of the tube 25.

In the use and operation of the invention the box 11 is positioned where mice or other animals have been observed with the compartments 22, 23 filled with water and food. Mice attempting to reach the food in the box 11 will press against the ball 27 and finding that it will move will roll it up the tube 25 until the animal can escape from the tube 25 through the opening 26. As soon as the animal leaves the tube 25 the ball 27 rolls back down the tube 25 until it engages the detents 28 and the trap is automatically reset for the next animal while securely fastening the first animal therein. The food and water in the compartments 22, 23 not only serve as bait to cause the animals to want to enter the box 11 but after they have entered the box 11 will keep them alive for an extended period of time so as not to putrefy and cause undesirable odors in the area where the animals are being trapped. The box 11 need only be emptied at infrequent intervals.

The natural tendency of rodents when trying to reach food is to nose any kind of object out of their way that will move while gnawing through any other objects of a material which will permit gnawing. The construction of the box and tube is entirely of sheet metal of the type which is not easily destroyed by animal gnawing.

Having thus described the preferred embodiment of the invention it should be understood that numerous structural modifications and adaptations may be resorted to without departing from the spirit of the invention.

I claim:

1. An animal trap comprising a closed box, a tube opening through one end of said box and sloping upwardly therefrom through said box, an opening in the upper side of said tube intermediate the opposite ends thereof, and a ball positioned in said tube nearly filling said tube for rolling action therein, said ball being movable by an animal from said end opening up said tube past said upper side opening to permit the animal to enter the box with the ball rolling back down the tube to close the end opening and trap the animal.

2. A device as claimed in claim 1 wherein said ball is formed of hard material to prevent animal gnawing thereof.

3. A device as claimed in claim 1 wherein food and water compartments are formed in said box to feed and water the animals trapped therein.

4. A device as claimed in claim 1 wherein said box and said tube are formed of sheet metal.

5. A device as claimed in claim 1 wherein ventilation openings extend through said box to admit air to the animals trapped therein and a cover hingedly secured to said box to give access to the interior thereof.

* * * * *